(12) United States Patent
Han et al.

(10) Patent No.: US 10,324,568 B2
(45) Date of Patent: Jun. 18, 2019

(54) TOUCH PANEL

(71) Applicant: Samsung Display Co., Ltd., Yongin-si (KR)

(72) Inventors: Sang Youn Han, Seoul (KR); Kyung Seop Kim, Hwaseong-si (KR); Sung Kyun Park, Suwon-si (KR); Sang Kyu Choi, Daejeon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/131,359

(22) Filed: Apr. 18, 2016

(65) Prior Publication Data

US 2017/0115770 A1    Apr. 27, 2017

(30) Foreign Application Priority Data

Oct. 22, 2015 (KR) ........................ 10-2015-0147567

(51) Int. Cl.
*G06F 3/045* (2006.01)
*G06F 3/044* (2006.01)

(52) U.S. Cl.
CPC .... *G06F 3/044* (2013.01); *G06F 2203/04112* (2013.01)

(58) Field of Classification Search
CPC ..................... G06F 2203/04112; G06F 3/044
See application file for complete search history.

(56) References Cited

U.S. PATENT DOCUMENTS

| | | | |
|---|---|---|---|
| 3,982,249 A | 9/1976 | Toman | |
| 5,298,708 A | 3/1994 | Babu et al. | |
| 5,572,035 A | 11/1996 | Franzen | |
| 5,931,557 A | 8/1999 | Danilychev | |
| 6,259,094 B1 | 7/2001 | Nagai et al. | |
| 6,621,459 B2 | 9/2003 | Webb et al. | |
| 8,648,319 B2 | 2/2014 | Koops | |
| 9,180,646 B2 | 11/2015 | Kim et al. | |
| 2015/0103261 A1 | 4/2015 | Lee et al. | |
| 2015/0130745 A1* | 5/2015 | Choi ....................... | G06F 3/044 345/174 |
| 2015/0214282 A1* | 7/2015 | Adachi ............... | H01L 27/3244 257/40 |

FOREIGN PATENT DOCUMENTS

| | | |
|---|---|---|
| KR | 10-2014-0110272 | 9/2014 |
| KR | 10-2014-0113026 | 9/2014 |
| KR | 10-2015-0019058 | 2/2015 |
| KR | 10-2015-0043845 | 4/2015 |

* cited by examiner

*Primary Examiner* — Insa Sadio
(74) *Attorney, Agent, or Firm* — H.C. Park & Associates, PLC

(57) ABSTRACT

A touch panel includes a touch electrode disposed on a substrate, the touch electrode including a metal layer; a phase matching layer disposed on the metal layer; and a thin film layer disposed on the phase matching layer.

16 Claims, 14 Drawing Sheets

TOUCH PANEL

CROSS-REFERENCE TO RELATED APPLICATION

This application claims priority from and the benefit of Korean Patent Application No. 10-2015-0147567, filed on Oct. 22, 2015, which is hereby incorporated by reference for all purposes as if fully set forth herein.

BACKGROUND

Field

Exemplary embodiments relates to a touch panel, and, more particularly, to a touch panel including a touch sensor.

Discussion of the Background

A display device, such as an organic light emitting diode (OLED) display, a liquid crystal display (LCD), an electrophoretic display (EPD), etc. may include a touch sensing function, which may allow a user to interact with the display device, in addition to an image displaying function by a display panel. The touch sensing function may determine touch information, such as whether an object touches a screen and a touch position thereof by sensing a change in pressure, charge, light, and the like, which may be applied to a screen of the display device, when a user touches the screen with a finger or a touch pen. The display device may receive an image signal based on the touch information.

The touch sensing function may be implemented by a touch sensor including a touch electrode. When a touch panel includes a touch electrode formed with metal, the touch panel may be formed to be flexible, however, the metal in the touch electrode may cause light reflection.

The above information disclosed in this Background section is only to enhancement of understanding of the background of the inventive concept, and, therefore, it may contain information that does not form the prior art that is already known in this country to a person of ordinary skill in the art.

SUMMARY

Exemplary embodiments of the present invention provide a touch panel with reduced light reflection from a touch electrode.

Additional aspects will be set forth in the detailed description which follows, and, in part, will be apparent from the disclosure, or may be learned by practice of the inventive concept.

According to an exemplary embodiment of the present invention, a touch panel includes a touch electrode disposed on a substrate, the touch electrode including a metal layer, a phase matching layer disposed on the metal layer, and a thin film layer disposed on the phase matching layer.

According to exemplary embodiments of the present invention, a touch electrode may be prevented from being recognized or deteriorating an image quality, by preventing or minimizing light reflection from a metal layer forming a touch electrode.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
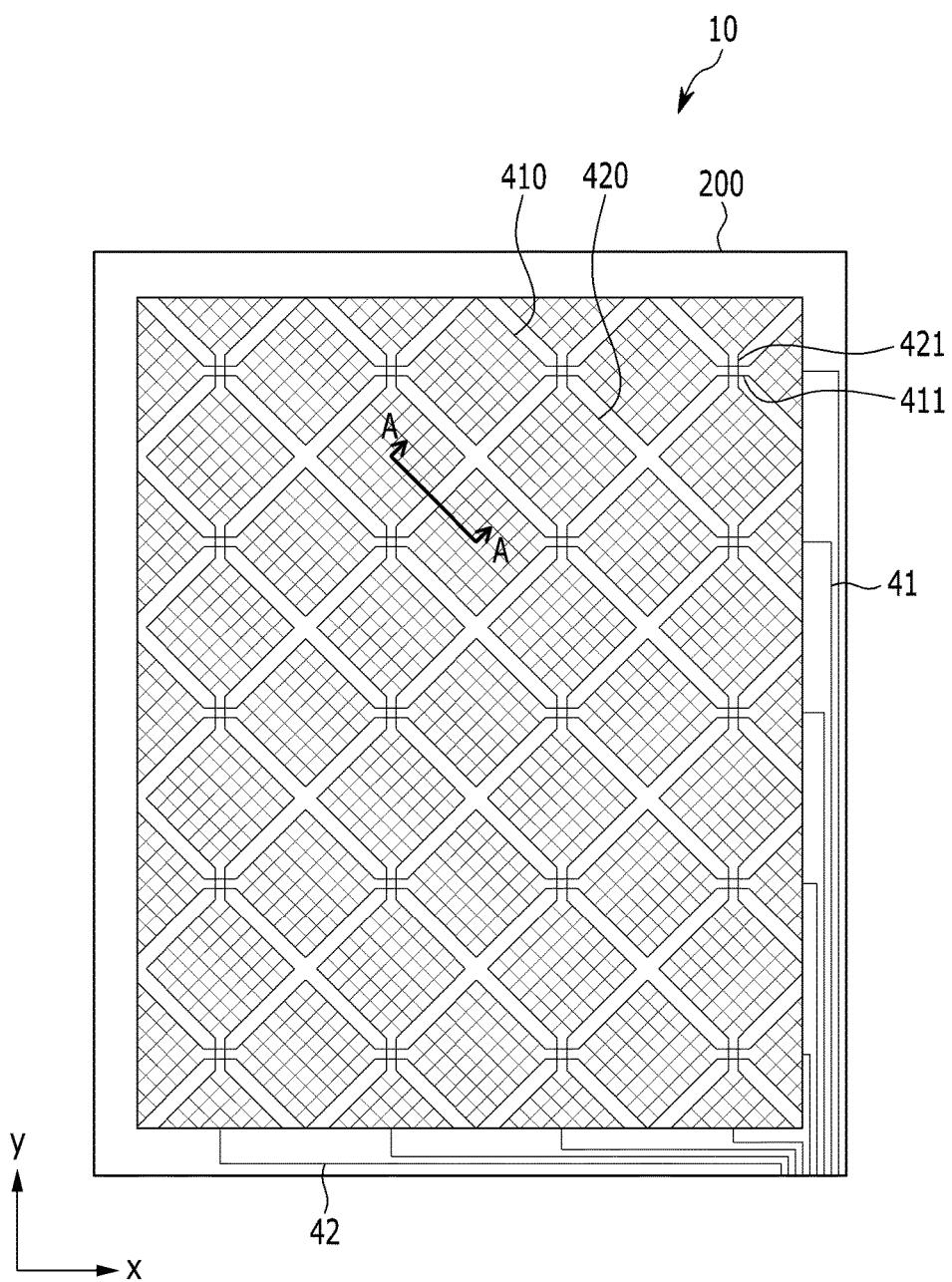
FIG. 1 schematically illustrates a top plan view of a touch panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a touch panel including a touch sensor according to an exemplary embodiment of the present invention will be described.

First, a touch panel according to exemplary embodiments of the present invention will be described with reference to FIGS. 1 to 4.

Figure 2:
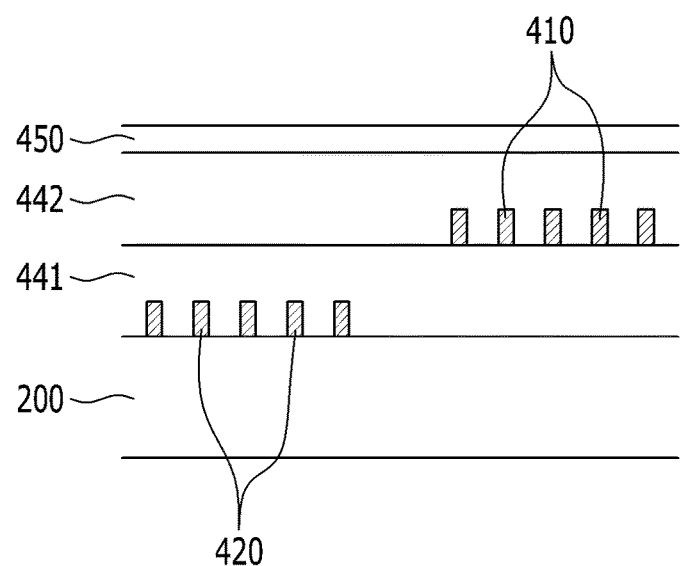
FIG. 2 illustrates a cross-sectional view taken along line A-A' of the touch panel of FIG. 1 according to an exemplary embodiment of the present invention.
Figure 3:
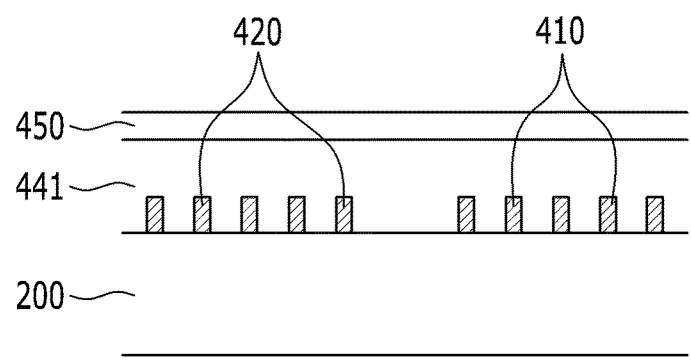
FIG. 3 illustrates a cross-sectional view taken along A-A' of the touch panel of FIG. 1 according to an exemplary embodiment of the present invention.
Figure 4:
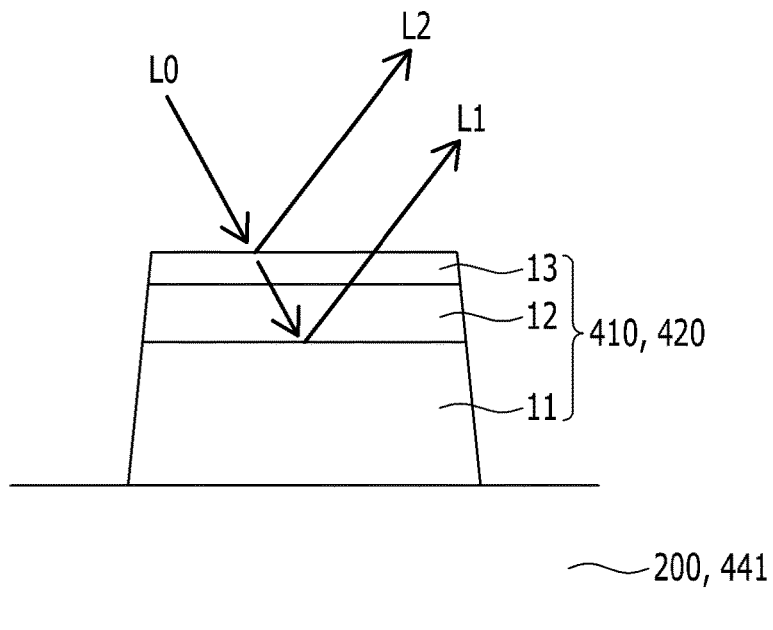
FIG. 4 illustrates a cross-sectional view of a stacked layer structure of a touch electrode according to an exemplary embodiment of the present invention.

FIG. 1 schematically illustrates a top plan view of a touch panel according to an exemplary embodiment of the present invention. FIG. 2 and FIG. 3 illustrate cross-sectional views taken along line A-A' of the touch panel of FIG. 1 according to exemplary embodiments of the present invention. FIG. 4 illustrates a cross-sectional view of a stacked layer structure of a touch electrode according to an exemplary embodiment of the present invention.

Referring to FIG. 1, a touch panel 10 includes a substrate 200 and touch electrodes 410 and 420 disposed on the substrate 200. The touch electrodes 410 and 420 may be disposed on separate substrates and attached to a display panel displaying an image, such as an OLED, an LCD, etc. (add-on type). Alternatively, the touch electrodes 410 and 420 may be disposed on an outer surface of a display panel (on-cell type), or disposed inside a display panel (in-cell type).

The substrate 200 may be made of a plastic, such as polycarbonate, polyethylene terephthalate, polyimide, polyamide, polyethylene naphthalate, polyethylene ether ketone, polyethylene sulfonate, polyarylate, etc., and be flexible. The substrate 200 may alternatively be a rigid substrate made of glass.

The touch electrodes 410 and 420 form touch sensors configured to sense a touch. As described herein, a touch may include a non-contact touch, in which an object approaches a touch panel and hovers around the touch panel, and a contact-touch, in which an object contacts the touch panel. A panel including the touch sensor may be referred to as a touch panel, a touch sensor panel, a touch screen panel, etc. Further, a display panel performing a function of the touch sensor may be referred to as a touch panel.

The touch electrodes 410 and 420 include first touch electrodes 410 and second touch electrodes 420 alternately disposed and not overlapping with each other. The first touch electrodes 410 may be respectively disposed along a row direction (x-axis direction) and a column direction (y-axis direction). The second touch electrodes 420 may be respectively disposed along the row direction and the column direction. The touch electrodes 410 and 420 may generally have a quadrangular shape. Alternatively, the touch electrodes 410 and 420 may have round or polygonal shapes. The touch electrodes 410 and 420 may include various shapes to improve sensitivity, such as protrusions. Touch electrodes disposed at edges of the touch panel 10 may generally have a triangular shape.

At least a portion of the first touch electrodes 410 arranged at the same row or column may be connected to or be separated from each other. At least a portion of the second touch electrodes 420 arranged at the same row or column may be connected to or be separated from each other. For example, as shown in FIG. 1, when the first touch electrodes 410 disposed on the same row are connected to each other, the second touch electrodes 420 disposed on the same column may be connected to each other. In this case, the first touch electrodes 410 disposed in each row are connected to each other by first connectors 411, which may form electrode rows, and the second touch electrodes 420 disposed in each column are connected to each other by second connectors 421, which may form electrode columns. Alternatively, the first touch electrodes 410 may be connected in the column direction, and the second touch electrodes 420 may be connected in the row direction.

The first and second touch electrodes 410 and 420 are physically and electrically separated from each other. Referring to FIG. 1, the first and second touch electrodes 410 and 420 may be spaced apart from each other by intervals, on which dummy electrodes (not shown) may be formed. The dummy electrodes may be formed at the intervals, so as to prevent a first region on which the first and second touch electrodes 410 and 420 are disposed and a second region on which the intervals are formed from being recognized differently due to different reflectances thereof. The dummy electrodes may be omitted.

Referring to FIG. 2, the first and second touch electrodes 410 and 420 may be disposed on different layers from each other. It is noted that, however, the first and second touch electrodes 410 and 420 may alternatively be disposed on the same layer, as shown in FIG. 3.

Referring to FIG. 2, the second touch electrodes 420 are disposed on the substrate 200, a first insulating layer 441 is disposed on the second touch electrodes 420, and the first touch electrodes 410 are disposed on the first insulating layer 441. Accordingly, the first and second touch electrodes 410 and 420 are disposed on different layers with the first insulating layer 441 therebetween. In this manner, the first connectors 411 and the first touch electrodes 410 may include the same material and be simultaneously disposed on the same layer, and the second connectors 421 and the second touch electrodes 420 may include the same material and be simultaneously disposed on the same layer. As the first connectors 411 and the second connectors 421 are disposed on different layers with the first insulating layer 441 therebetween, the first and second connectors 411 and 421 may be electrically separated from each other, even though the first and second connectors 411 and 421 cross each other.

A second insulating layer 442 is disposed on the second touch electrodes 420. Accordingly, one insulating layer 442 is disposed on the first touch electrodes 410, and two insulating layers 441 and 442 are disposed on the second touch electrodes 420. Alternatively, the first insulating layer 441 may be disposed below the first touch electrodes 410, and the second touch electrodes 420 may be disposed on the first insulating layer 441. A reflective reduction layer 450 may be disposed on the second insulating layer 442. The reflective reduction layer 450 will be described later below.

Referring to FIG. 3, the first and second touch electrodes 410 and 420 are disposed on the substrate 200. The first insulating layer 441 is disposed on the first and second touch electrodes 410 and 420. In this case, one of the first connectors 411 and the second connectors 421 may be disposed on the same layer as the first and second touch electrodes 410 and 420, and the other one of the first and second connectors 411 and 421 may be disposed on a different layer from a layer on which the first and second touch electrodes 410 and 420 are disposed, by forming the insulating layer therebetween. In this manner, the first connectors 411 and the second connectors 421 may cross each other while being insulated from each other. For example, one of the first connectors 411 and the second connectors 421 disposed on the first insulating layer 441, may electrically connect adjacent first touch electrodes 410 or adjacent second touch electrodes 420 through a contact hole (not shown) formed in the first insulating layer 441. The connectors disposed on the same layer as the first and second touch electrodes 410 and 420 may include the same material and be simultaneously formed with the first and second touch electrodes 410 and 420. The connectors disposed on a different layer from the first and second touch electrodes 410 and 420 may be formed of a transparent conductive oxide (TCO), such as indium tin oxide (ITO) or indium zinc oxide (IZO). The reflective reduction layer 450 may be disposed on the first insulating layer 441.

The first and second touch electrodes 410 and 420 may have a mesh pattern, which includes crossing lines. Since the mesh pattern is flexible, a flexible touch panel including the mesh pattern may be bendable, foldable, or rollable. When the touch electrodes have a mesh pattern, since areas thereof overlapping the display panel are smaller than those of the transparent electrodes (e.g., ITO, IZO, etc.) having the same size, due to openings formed in the mesh pattern (e.g., portions in which the lines do not exist in the mesh pattern), and thus, parasitic capacitance between the touch electrodes and display panel electrodes (e.g., common electrodes) may decrease. As the parasitic capacitance decreases, touch sensitivity may increase, thereby securing a driving margin, for example, securing a report rate by increasing the maximum frequency of a driving signal. The lines forming the mesh pattern may have a width of several to several tens of micrometers. The width of the lines of the mesh pattern may be equal to or less than about 1.7 μm.

Referring to FIG. 4, a stacked layer structure of the touch electrodes 410 and 420 according to an exemplary embodiment of the present invention will be described.

The touch electrodes 410 and 420 have a triple-layered structure. For example, the touch electrodes 410 and 420 include a metal layer 11, a phase matching layer 12, and a thin film layer 13. The metal layer 11 may be a conductive layer, such that the touch electrodes 410 and 420 may function as a touch sensor. The phase matching layer 12 and the thin film layer 13 may reduce (or prevent) light reflection from the metal layer 11. The phase matching layer 12 and the thin film layer 13 may be referred to as anti-reflective layers. The phase matching layer 12 may be disposed directly on the metal layer 11 to contact the metal layer 11, and the thin film layer 13 may be disposed directly on the phase matching layer 12 to contact the phase matching layer 12. According to an exemplary embodiment of the present invention, the touch electrodes 410 and 420 may have a stacked structure including triple-layers or more. The relationship between the metal layer 11, the phase matching layer 12, and the thin film layer 13 will be described in detail later.

The metal layer 11 may function as an electrode of a capacitor forming a mutual capacitor or a self-capacitor. The metal layer 11 is electrically connected to touch signal lines 41 and 42 (see FIG. 1) that transmit a driving signal or an output signal.

The metal layer 11 may include an aluminum-based metal, such as aluminum (Al) or an aluminum alloy. For example, the aluminum alloy may be an aluminum (Al)-neodymium (Nd) alloy. The aluminum has a Young's modulus of about 69 MPa, and is known to have the lowest Young's modulus among metals that may be utilized as a wire. Since the aluminum-based metal has a low modulus, strain stress is small, and thus, the flexible touch panel including the aluminum-based metal may be as foldable, bendable, etc., as compared to other metals. For example, as compared to a layer including a metal such as copper, a layer including the aluminum-based metal may be patterned to have a very narrow line width through dry etching, etc. In general, the line width may be equal to or less than about 1.7 µm to prevent a moiré phenomenon. A mesh pattern may be formed with such a fine line width by using the aluminum-based metal. Alternatively, the metal layer 11 may include metals, such as molybdenum (Mo), silver (Ag), titanium (Ti), copper (Cu), and the like, or an alloy thereof, and may have a multi-layered structure such as titanium/aluminum/titanium (Ti/Al/Ti), molybdenum/aluminum/molybdenum (Mo/Al/Mo), etc.

While utilizing the aluminum-based metal may be advantageous in forming a mesh pattern to have the fine line width in a flexible touch panel, however, external light may be reflected by such a metal, which may cause the touch electrodes to be recognized or observed, and/or deteriorate quality of an image displayed on the display panel. According to an exemplary embodiment of the present invention, the touch electrodes 410 and 420 include the phase matching layer 12 and the thin film layer 13 formed on the metal layer 11, to reduce light reflected from the metal layer 11 that forms the touch electrodes. In this manner, light reflection of touch electrodes 410 and 420 may be reduced by destructive interference between first reflected light L1 reflected by the metal layer 11 and second reflected light L2 reflected by the thin film layer 13. The phase matching layer 12 is disposed between the metal layer 11 and the thin film layer 13, to form a path to make a phase difference therebetween, such that the destructive interference occurs between the reflected lights L1 and L2.

The phase matching layer 12 disposed on the metal layer 11 may include a metal oxide, for example, an oxide of the metal forming the metal layer 11. The phase matching layer 12 may be optically transparent. As used herein, "optically transparent" may refer to passing about 50% or more of light in the visible wavelength range therethrough, for example, transmitting about 80% of light in the visible wavelength range. When the metal layer 11 includes the aluminum-based metal, the phase matching layer 12 may include an aluminum oxide ($AlO_x$). An aluminum oxide layer may be formed by oxidizing a surface of the aluminum-based metal layer formed on the metal layer 11, or by reactive sputtering deposition of aluminum while supplying oxygen. The phase matching layer 12 may be formed by depositing a transparent inorganic material, such as a silicon oxide ($SiO_x$) and a silicon nitride ($SiN_x$), or a transparent conductive oxide, such ITO and IZO.

The thin film layer 13 disposed on the phase matching layer 12 may be a semi-transmissive layer that reflects some incident light and transmits the remaining portion of the incident light. The thin film layer 13 may include a metallic material. In this manner, a difference between an amplitude of the second reflected light L2 reflected by the thin film layer 13 and an amplitude of the first reflected light L1 reflected by the metal layer may be small. As the amplitude difference is smaller, the effect of destructive interference may be higher. When the thin film layer 13 includes a metal material, the amplitude difference of the first reflected light L1 and the second reflected light L2 may decrease. The thin film layer 13 may include a material with a high light absorption ratio, such as Ti, Mo, etc. When the thin film layer 13 has a high light absorption ratio, light reflectance from the thin film layer 13 may be reduced.

The touch electrodes 410 and 420 that have the mesh pattern and the triple-layered structure may be formed by stacking layers on the substrate 200 or the first insulating layer 441, and then patterning the stacked layers through a photolithography process using one mask, to respectively form the metal layer 11, the phase matching layer 12, and the thin film layer 13.

When the touch electrodes 410 and 420 have the triple-layered structure, a first portion of external light L0 incident upon the touch electrodes 410 and 420 is reflected by the thin film layer 13, a second portion of the light is absorbed by the thin film layer 13, and the remaining third portion of the light passes through the thin film layer 13 and proceeds to the phase matching layer 12. The second portion of the light passing through the phase matching layer 12 is reflected by the metal layer 11. Accordingly, a phase of the reflected light (i.e., a first reflected light L1) is adjusted as the second portion of the light is reflected by the metal layer 11 and passes through the phase matching layer 12. In this manner, destructive interference occurs between the first reflected light L1 and a second reflected light L2 reflected by the thin film layer 13, thereby eliminating or reducing light reflected by the touch electrodes 410 and 420. When the phase matching layer 12 is optically transparent, most of light passing through the thin film layer 13 may reach the metal layer 11 and is reflected by the metal layer 11, which then may be emitted away from the touch electrodes 410 and 420. Thus, the optically transparent phase matching layer 12 may render the amount of the first reflected light L1 to be substantially equal to that of the second reflected light L2.

The thickness of the metal layer 11 may be set in consideration of a line width, resistance characteristic, etc., and may be in a range of several hundred to thousands of Angstroms. For example, when the metal layer 11 includes aluminum, the metal layer 11 may have a thickness in a range of about 300 to 4000 Å.

A thickness of the phase matching layer 12 may be adjusted, to cause destructive interference between the first reflected light L1 reflected by the metal layer 11 and the second reflected light L2 reflected by the thin film layer 13, and may be in a range of about several tens to hundreds of Angstroms. When the phase difference between the first reflected light L1 and the second reflected light L2 is about 180°, the effect of the destructive interference may be the greatest. Accordingly, the phase matching layer 12 may have a thickness, which may form a light path to cause the reflected lights L1 and L2 to be "out of phase".

The thin film layer 13 may have a thickness of about several tens to hundreds of Angstroms. However, as the thickness of the thin film layer 13 increases, the reflectance of the thin film layer 13 may excessively increase (particularly, when the thin film layer 13 includes a metal layer). As such, the thin film layer 13 may be formed to have a thin thickness, for example, of about 100 Å.

The thicknesses of the phase matching layer 12 and the thin film layer 13 may be relatively set in consideration of the materials forming respective layers. For example, when the phase matching layer 12 includes $AlO_x$ and the thin film layer 13 includes Ti or Mo, the phase matching layer 12 may have a thickness range of about 550 to about 750 Å, and the thin film layer 13 may have a thickness range of about 50 to about 200 Å. When the phase matching layer 12 includes $SiO_x$ and the thin film layer 13 includes Ti or Mo, the phase matching layer 12 may have a thickness range of about 500 to about 700 Å, and the thin film layer 13 may have a thickness range of about 50 to about 200 Å. Since the thin film layer 13 itself forms a light path, the thickness of the thin film layer 13 and the thickness of the phase matching layer 12 may affect the destructive interference.

Table 1 illustrates a simulation and measured results with respect to the reflectance of touch electrodes having the triple-layered structure according to an exemplary embodiment of the present invention. The touch electrodes have a structure, in which the metal layer 11 of Al, the phase matching layer 12 of $AlO_x$, and thin film layer 13 of Ti are disposed on a polycarbonate substrate. Reflectance for nine combinations is measured while thicknesses of the substrate and the metal layer 11 are respectively fixed at about 50 μm and about 3000 Å, and thicknesses of the phase matching layer 12 and the thin film layer 13 are varied. The measured reflectance is the reflectance of the wavelength of about 550 nm. The measured data may be different from the simulation data as samples to be measured may not completely conform to the simulation in thickness, flatness, etc. due to fabrication errors.

TABLE 1

|  | Simulation reflectance (%) | | | Measured reflectance (%) | | |
| --- | --- | --- | --- | --- | --- | --- |
|  | $AlO_x$ 600 Å | $AlO_x$ 650 Å | $AlO_x$ 700 Å | $AlO_x$ 600 Å | $AlO_x$ 650 Å | $AlO_x$ 700 Å |
| Ti 100 Å | 2.33 | 1.11 | 1.00 | 3.40 | 1.89 | 2.97 |
| Ti 110 Å | 2.22 | 1.20 | 1.21 | 3.88 | 3.89 | 4.69 |
| Ti 120 Å | 2.47 | 1.65 | 1.76 | 5.78 | 5.89 | 7.02 |

The simulation data illustrates exceedingly low reflectance as compared to the measured reflectance, by about 2.5% or less for all of the nine combinations. In particular, when the thicknesses of the phase matching layer 12 and the thin film layer 13 are respectively about 700 Å and about 100 Å, the reflectance is the lowest at about 1%. Although the reflectance in the measured data is higher than that in simulation data, the reflectance of eight combinations are respectively less than about 6%, and when the thicknesses of the phase matching layer 12 and the thin film layer 13 are respectively about 650 Å and 100 Å, the reflectance is the lowest at about 1.89%. Reflectance for the wavelength range (about 380 to 780 nm) of visible light is shown graphically in FIGS. 5 to 8, as described below.

Table 2 illustrates simulation results for the reflectance of the touch electrodes, depending on the thickness of the thin film layer 13, according to an exemplary embodiment of the present invention. The touch electrodes have a structure, in which the metal layer 11 of Al, the phase matching layer 12 of $AlO_x$, and thin film layer 13 of Ti are disposed on a polycarbonate substrate. Reflectance is measured while thicknesses of the substrate, the metal layer 11, and the phase matching layer 12 are respectively fixed at about 50 μm, about 2500 Å, and 600 Å, and a thickness of the thin film layer 13 is varied by about 10 Å. The measured reflectance is the reflectance of a wavelength of about 550 nm.

TABLE 2

| Thickness (Å) | 50 | 60 | 70 | 80 | 90 | 100 | 110 | 120 |
| --- | --- | --- | --- | --- | --- | --- | --- | --- |
| Reflectance (%) | 13.8 | 9.3 | 6.2 | 4.1 | 2.9 | 2.3 | 2.2 | 2.5 |
| Thickness (Å) | 130 | 140 | 150 | 160 | 170 | 180 | 190 | 200 |
| Reflectance (%) | 3.0 | 3.8 | 4.7 | 5.7 | 6.8 | 8.0 | 9.2 | 10.5 |

As illustrated in Table 2, when the thickness of the thin film layer 13 is about 50 Å and about 200 Å, the reflectance exceeds about 10%, and when the thickness of the thin film layer 13 is between about 60 Å and about 190 Å, the reflectance is equal to or less than about 10%. Accordingly, when reflectance of about 10% or less is required, the thin film layer 13 may be formed to have a thickness of about 50 to 200 Å or about 60 to 190 Å. When the reflectance is less than about 10%, the touch electrodes may not be recognized. When reflectance of about 5% or less is required, the thin film layer 13 may be formed to have a thickness of about 80 to 150 Å.

Figure 5:
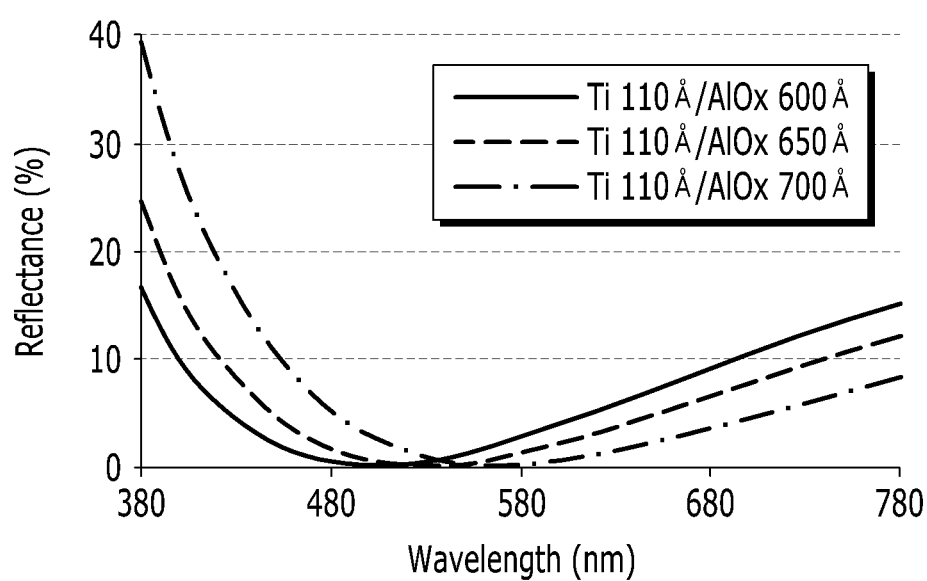
FIG. 5 illustrates a graph of simulation reflectance of a touch electrode according to an exemplary embodiment of the present invention.
Figure 6:
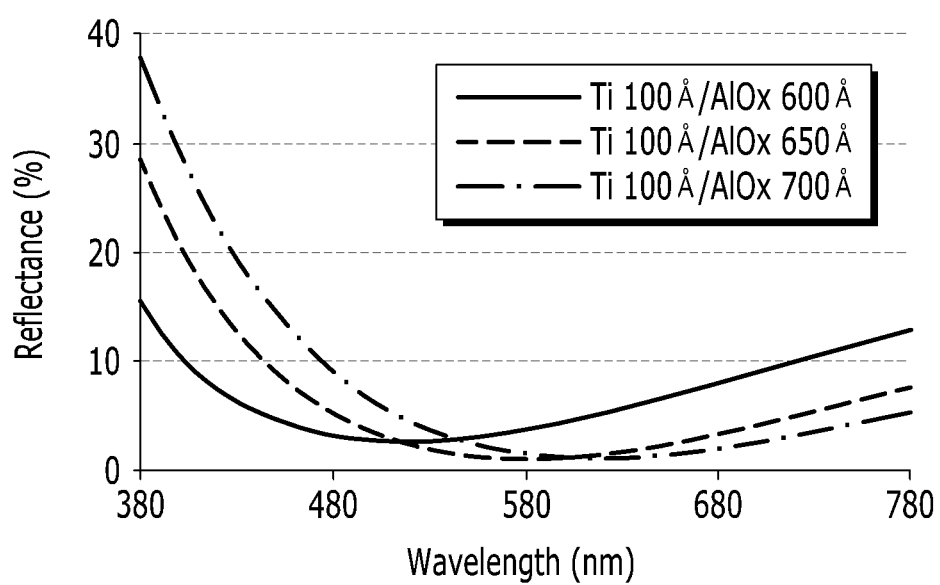
FIG. 6, FIG. 7, and FIG. 8 illustrate graphs of reflectance of a touch electrode according to an exemplary embodiment of the present invention.
Figure 7:
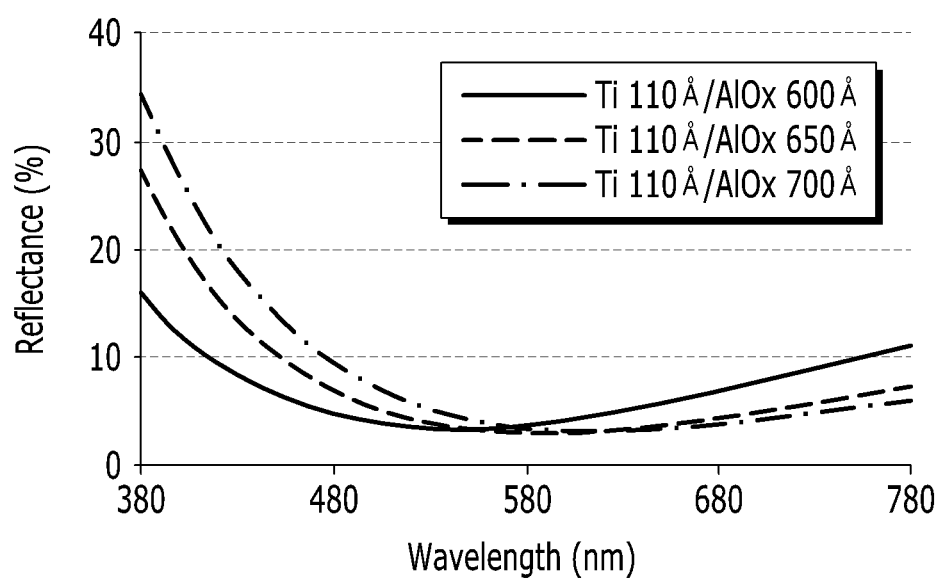
Figure 8:
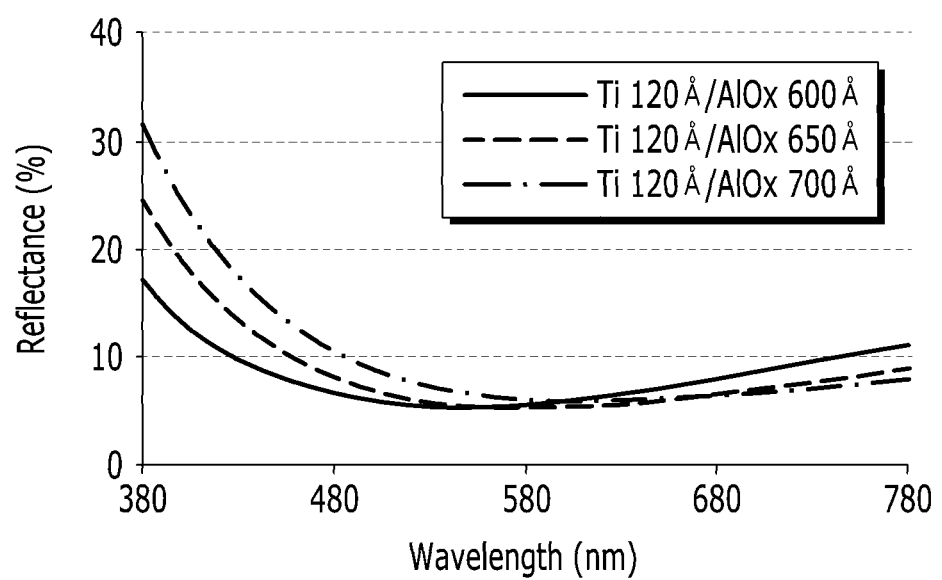

FIG. 5 illustrates a graph of simulation reflectance of a touch electrode according to an exemplary embodiment of the present invention. FIGS. 6 to 8 illustrate graphs of measured reflectance of a touch electrode according to exemplary embodiments of the present invention.

Simulation data for the thin film layer 13 including Ti and having a thickness of about 110 Å is illustrated in FIG. 5. Measured data for the thin film layer 13 having a thickness of about 100, 110, and 120 Å are respectively illustrated in FIGS. 6, 7, and 8.

Referring to FIGS. 5, 6, 7, and 8, as the thickness of the phase matching layer 12 including AlOx increases, the reflectance of the blue wavelength increases. In the thin film layer 13 including Ti, as the thickness of the Ti layer increases, deviation of the reflectance affected by the varying thickness of the $AlO_x$ layer decreases, but the reflectance increases around the wavelength of about 550 nm. This may be because reflection by the thin film layer 13 proportionally increases depending on the thickness thereof.

Referring back to FIG. 1, the first touch signal line 41 is connected to one end of each electrode row, and the second touch signal line 42 is connected to one end of each electrode column. Alternatively, the touch signal lines 41 and 42 may be connected to opposite ends of the electrode column and/or the electrode row. The touch electrodes 410 and 420 may respectively receive a driving signal from a touch controller (not shown) and transmit an output signal to the touch controller through the touch signal lines 41 and 42.

The first and second touch signal lines 41 and 42 may include the same material as the metal layer 11 of the touch electrodes 410 and 420. For example, the first and second touch signal lines 41 and 42 may include an aluminum-based metal. Alternatively, the first and second touch signal lines 41 and 42 may include a metal, such as Mo, Ag, Ti, Cu, or an alloy thereof, and may have a multi-layered structure such as Ti/Al/Ti or Mo/Al/Mo.

Neighboring first and second touch electrodes 410 and 420 form a mutual capacitor functioning as a touch sensor. More particularly, the metal layer 11 of the first touch electrodes 410 and the metal layer 11 of the second touch electrodes 420 form a mutual capacitor. When the phase matching layer 12 of the touch electrodes 410 and 420 includes a transparent conductive oxide, and the thin film layer 13 includes a metal material, since the phase matching layer 12 and the thin film layer 13 are electrically connected to the metal layer 11, both of the first and second touch electrodes 410 and 420 may form the mutual capacitor.

The mutual capacitor may receive a driving signal through one of the first and second touch electrodes 410 and 420, and may output an output signal, which may be a change in an amount of charge due to a contact of an external object, through the other one of the first and second touch electrodes 410 and 420. For example, the first touch electrodes 410 may be an input electrode Tx and the second touch electrodes 420 may be an output electrode Rx, or vice versa. One of the first and second touch signal lines 41 and 42 transmits the driving signal from a touch controller (not shown) to the first touch electrodes 410 or the second touch electrodes 420, and the other touch signal line transmits the output signal from the second touch electrodes 420 or the first touch electrodes 410 to the touch controller.

According to an exemplary embodiment of the present invention, the first touch electrodes 410 are separated from each other and the second touch electrodes 420 are separated from each other. In this manner, the first and second touch electrodes 410 and 420 may respectively form independent touch electrodes and be connected to the touch controller through respective touch signal lines (not shown). In this case, the respective touch electrodes may form a self-capacitor that serves as the touch sensor. The self-capacitor may be charged with a predetermined amount of charge by receiving a sensing input signal, and when a contact from an external object occurs, the amount of charge thereof may be changed to output a sensing output signal that is different from the received sensing input signal.

Referring back to FIGS. 2 and 3, the first insulating layer 441 or the second insulating layer 442 is disposed on the first and second touch electrodes 410 and 420. The first insulating layer 441 and second insulating layer 442 may electrically isolate the first and second touch electrodes 410 and 420 and protect the first and second touch electrodes 410 and 420. The first insulating layer 441 and the second insulating layer 442 may include an inorganic material, such as $SiN_x$, $SiO_x$, or an organic material such as an acryl-based polymer. When the first and second insulating layers 441 and 442 include the inorganic material, the first insulating layer 441 and the second insulating layer 442 may respectively have a thickness of several thousands of angstroms, for example, a thickness range of about 1000 to about 4000 Å. When the first and second insulating layers 441 and 442 include the organic material, the first insulating layer 441 and the second insulating layer 442 may respectively have a thickness of several micrometers, for example, a thickness range of about 1 to 3 µm.

The reflectance of the touch electrodes 410 and 420 (more specifically, the reflectance of a region on which the touch electrodes 410 and 420 are formed) may be increased due to the first insulating layer 441 and the second insulating layer 442. When the insulating layer includes an inorganic material, the reflectance increase in the touch electrodes 410 and 420 may be greater than when the insulating layer includes an organic material. The reflectance increase due to the insulating layer including the inorganic material may be prevented or reduced, by disposing the reflective reduction layer 450 on the insulating layers 441 and 442. The reflective reduction layer 450 may be formed of a low transparent refractive index material, such as a silicon oxynitride ($SiO_xN_y$). The reflective reduction layer 450 may have a thickness range of about 500 to about 1000 Å.

Hereinafter, the reflectance of touch electrodes 410 and 420 in a touch panel including the first touch electrodes 410, the first insulating layer 441, the second touch electrodes 420, and the second insulating layer 442, as shown in FIG. 2, will be described. Table 3 represents the simulation results of the reflectance based on the structure of the touch electrodes 410 and 420 and the presence of the reflective reduction layer 450. As described herein, "No capping" refers to the reflectance of the touch electrodes 410 and 420, on which the first insulating layer 441 and the second insulating layer 442 are not disposed. For comparison purposes, a touch electrode structure including a single aluminum layer is illustrated in Table 3, in addition to the structure of the touch electrodes having the triple-layered structure according to an exemplary embodiment of the present invention. In Table 3, "-" refers to a corresponding layer not being present.

The substrate 200 is a polycarbonate having a thickness of about 500 µm. The metal layers 11 of the first and second touch electrodes 410 and 420 include Al and have a thickness of about 3000 Å. The first insulating layer 441 and the second insulating layer 442 respectively includes a silicon nitride ($SiN_x$), and have a thickness of about 2000 Å or an organic layer of about 1.5 µm. The reflective reduction layer 450 includes $SiO_xN_y$, and has a thickness of about 700 Å. Stacked layer structures and thicknesses of the touch electrodes having the triple-layered structure of Ti/AlO$_x$/Al according to exemplary embodiments of the present invention are respectively illustrated in FIGS. 9 to 14. Each configuration of the touch electrodes illustrated with reference to FIGS. 9 to 14 are indicated in Table 3.

TABLE 3

Figure 9:
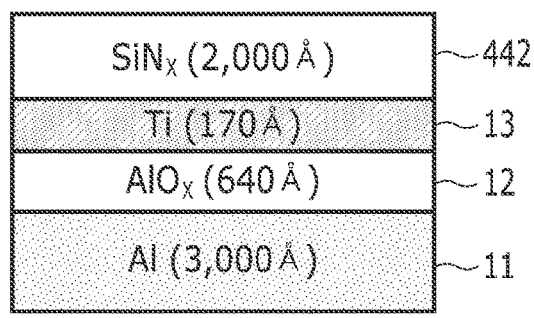
FIG. 9, FIG. 10, FIG. 11, FIG. 12, FIG. 13, and FIG. 14 illustrate cross-sectional views of stacked layer structures of touch panels according to exemplary embodiments of the present invention.
Figure 10:
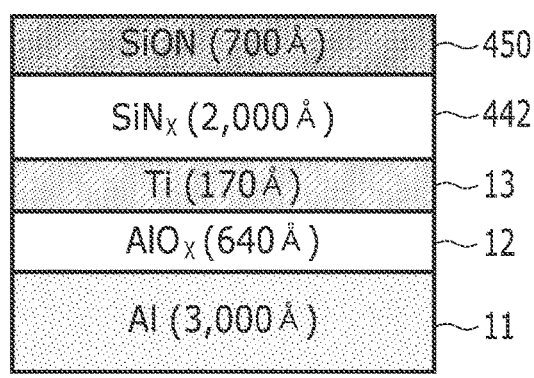
Figure 11:
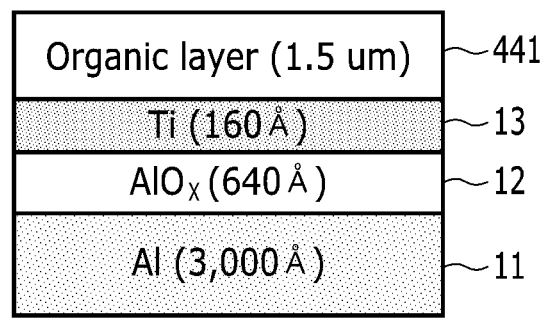
Figure 12:
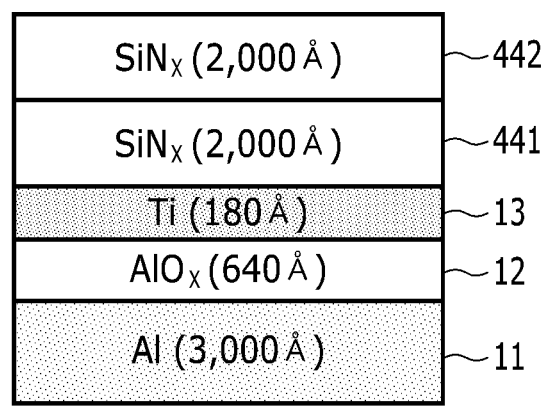
Figure 13:
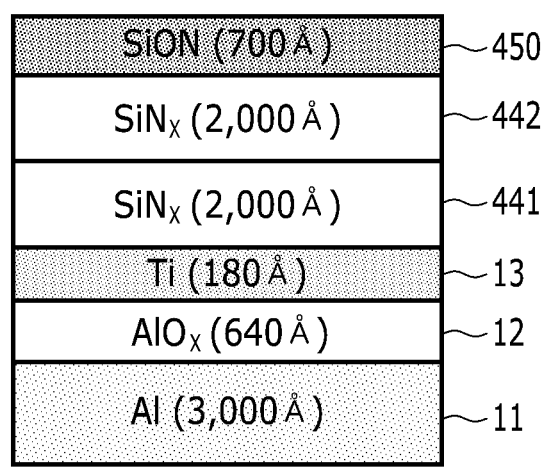
Figure 14:
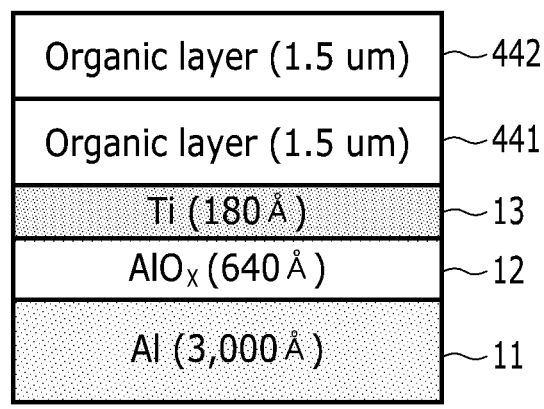

| Item | Touch electrodes structure | First insulating layer | Second insulating layer | Reflective reduction layer | Reflectance (%) | Related drawing |
|---|---|---|---|---|---|---|
| No capping | Ti/SiO$_x$/Al | — | — | — | 4.9 | |
| | Ti/AlO$_x$/Al | — | — | — | 6.0 | |
| | Al | — | — | — | 90.0 | |
| First touch electrode | Ti/SiO$_x$/Al | — | SiN$_x$ | — | 8.2 | |
| | Ti/AlO$_x$/Al | — | SiN$_x$ | — | 8.4 | FIG. 9 |
| | Al | — | SiN$_x$ | — | 84.5 | |
| | Ti/SiO$_x$/Al | — | SiN$_x$ | SiON | 4.0 | |
| | Ti/AlO$_x$/Al | — | SiN$_x$ | SiON | 3.7 | FIG. 10 |
| | Al | — | SiN$_x$ | SiON | 81.4 | |
| | Ti/AlO$_x$/Al | organic layer | — | — | 6.9 | FIG. 11 |
| | Al | organic layer | organic layer | — | 87.1 | |
| Second touch electrode | Ti/SiO$_x$/Al | SiN$_x$ | SiN$_x$ | — | 9.4 | |
| | Ti/AlO$_x$/Al | SiN$_x$ | SiN$_x$ | — | 9.7 | FIG. 12 |
| | Al | SiN$_x$ | SiN$_x$ | — | 83.0 | |
| | Ti/SiO$_x$/Al | SiN$_x$ | SiN$_x$ | SiON | 3.9 | |
| | Ti/AlO$_x$/Al | SiN$_x$ | SiN$_x$ | SiON | 4.1 | FIG. 13 |
| | Al | SiN$_x$ | SiN$_x$ | SiON | 80.8 | |
| | Ti/AlO$_x$/Al | organic layer | organic layer | — | 7.0 | FIG. 14 |
| | Al | organic layer | organic layer | — | 87.0 | |

As shown in Table 3, when the insulating layer includes $SiN_x$, the reflectance of the touch electrodes is increased by about 2 to 5% more than when the insulating layer is not present. When the insulating layer includes an organic material, the reflectance of the touch electrodes is increased by about 1% more than when the insulating layer is not present. When the reflective reduction layer including $SiO_xN_y$ is disposed on the insulating layer including $SiN_x$, the reflectance of the touch electrodes is decreased by about 4% or less. When the touch electrodes have a single aluminum layer structure, the reflectance thereof is above about 80%. When the touch electrodes have the triple-layered structure according to the exemplary embodiments of the present invention, the reflectance thereof is decreased by about 4 to 10%, as compared to that in the single aluminum layer structure, depending on the presence or absence of the insulating layer and the reflective reduction layer.

Hereinafter, an operation of the touch sensor according to an exemplary embodiment of the present invention will be described with reference to FIGS. 15 and 16.

Figure 15:
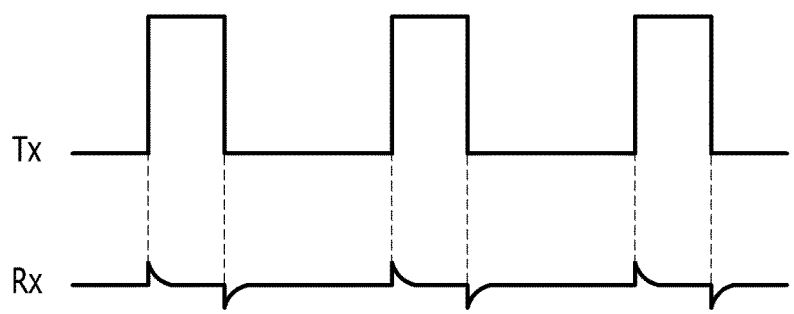
FIG. 15 illustrates a waveform diagram of a signal applied to a touch sensor according to an exemplary embodiment of the present invention.
Figure 16:
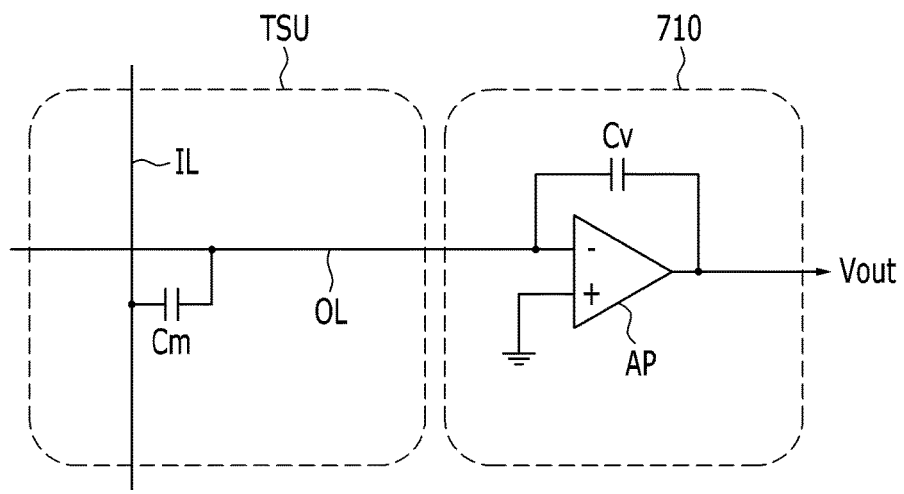
FIG. 16 illustrates a circuit diagram of a touch sensor and a touch signal processor according to an exemplary embodiment of the present invention.

FIG. 15 illustrates a waveform diagram of a signal applied to a touch sensor according to an exemplary embodiment of the present invention. FIG. 16 illustrates a circuit diagram of a touch sensor and a touch signal processor according to an exemplary embodiment of the present invention.

Referring FIG. 15 and FIG. 1, the first touch electrodes 410 may be an input electrode Tx and the second touch electrodes 420 may be an output electrode Rx, or vice versa.

The input electrode Tx receives a driving signal. The driving signal may have various waveform and voltage levels, for example, may include periodically outputted pulses or at least two different voltage levels. A DC voltage may be applied to the output electrode Rx. For example, a square wave voltage swung between about 0 V and 3 V may be applied to the input electrode Tx, and a DC voltage of about 1.5 V may be applied to the output electrode Rx. Even though the DC voltage is applied to the output electrode Rx, a voltage may be varied by coupling with the swung driving signal. An electric field and a capacitance are generated due to a potential difference between the input electrode Tx and the output electrode Rx, and since a width of a voltage variation of the output electrode Rx is changed when the capacitance is changed by contact of a finger, a touch pen, or the like, the touch may be sensed based on this change.

The sensitivity of the touch sensor may be increased, as a variation of capacitance is increased at the time of a touch with respect to a base capacitance. The parasitic capacitance, which occurs between the input electrode Tx or a connection part thereof and the output electrode Rx or a connection part thereof, may increase the base capacitance, which may deteriorate the sensitivity of the touch sensor. Therefore, to improve the sensitivity, the parasitic capacitance may be reduced. Since the touch electrodes according to the exemplary embodiments of the present invention are formed to have the mesh pattern, the parasitic capacitance may be effectively reduced.

An operation of a touch sensor will be described with reference to FIG. 16. One touch sensor unit TSU may be configured by one first touch electrode 410 and one second touch electrode 420 illustrated with reference to FIG. 1. The touch sensor unit TSU may include a mutual capacitor Cm, which may be configured by an input line IL that may be the first touch electrode 410 and an output line OL that may be the second touch electrode 420. The mutual capacitor Cm may include an overlap sensing capacitor, which may be configured by an overlap between the input line IL and the output line OL, or a fringe sensing capacitor, which may be configured by the neighboring input line IL and output line OL that may not overlap each other.

The touch sensor unit TSU may receive the driving signal from the input line IL and output an output signal, which may correspond to a change of the amount of charge in the mutual capacitor Cm that may occur by a contact of an external object. Specifically, when the driving signal is input to the touch sensor unit TSU, the mutual capacitor Cm is charged with a predetermined amount of charge, and when the external object contacts the touch sensor unit TSU, the amount of charge charged in the mutual capacitor Cm is changed, such that a signal corresponding to the change is output to the output line OL. A difference between the output signals generated when the object contacts the touch panel and when the object does not contact the touch panel, may be approximately in proportion to a change of the amount of charge in the mutual capacitor Cm.

A signal processor 710 of the touch sensor may receive the output signal from the output line OL, and process the output signal to generate touch information, such as the occurrence of a touch, a touch position, and the like. To this end, the signal processor 710 may include amplifiers AP connected to the output line OL. The amplifier AP may include a capacitor Cv connected between an inverting terminal (−) and an output terminal thereof. A non-inverting terminal (+) of the amplifier AP is connected to a predetermined voltage, such as a ground voltage, and the inverting terminal (−) thereof is connected to the output line OL. The amplifier AP, which may be an integrator, may integrate the output signal from the output line OL for a predetermined time (for example, one frame) to generate a detection signal Vout.

A display device including the touch panel according to an exemplary embodiment of the present invention will be described with reference to FIGS. 17 and 18.

Figure 17:
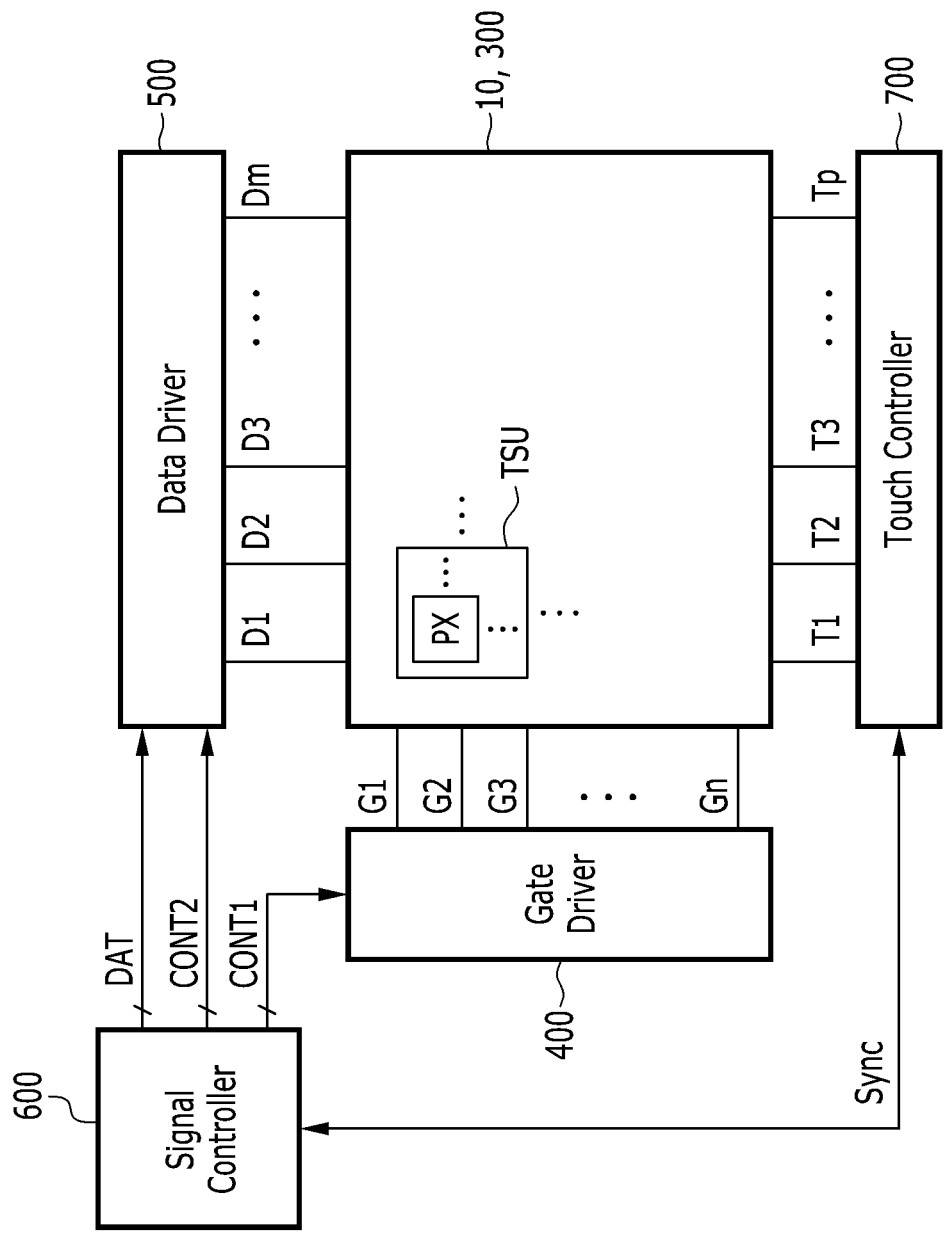
FIG. 17 illustrates a layout view of a display device including a touch panel according to an exemplary embodiment of the present invention.

FIG. 17 illustrates a layout view of a display device including the touch panel according to an exemplary embodiment of the present invention. FIG. 18 schematically illustrates a stacked layer structure of the display device including the touch panel according to an exemplary embodiment of the present invention.

Figure 18:
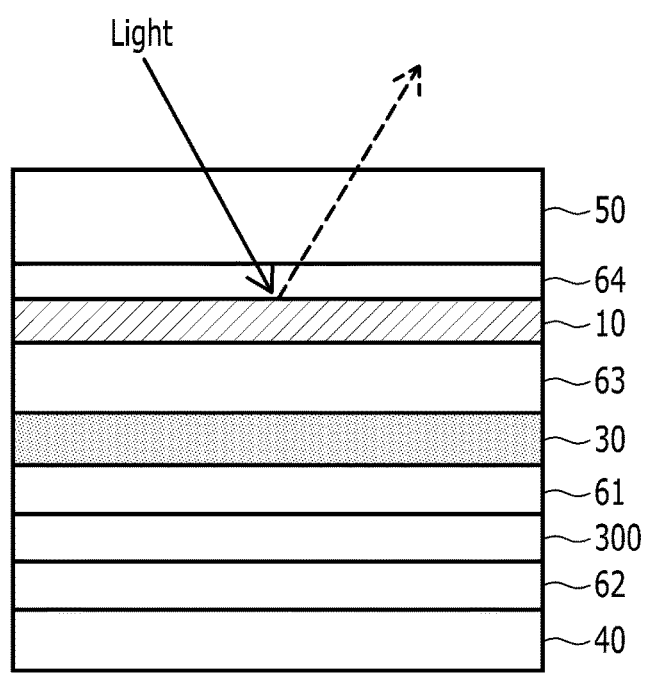
FIG. 18 schematically illustrates a stacked layer structure of a display device including a touch panel according to an exemplary embodiment of the present invention.

Referring to FIGS. 17 and 18, the display device including the touch panel according to the present exemplary embodiment includes a display panel 300, a gate driver 400 and a data driver 500 connected to the display panel 300, and a signal controller 600 controlling the gate driver 400 and the data driver 500. The display device further includes a touch panel 10 and a touch controller 700 controlling the touch panel 10.

A polarizer 30 is attached to a top surface of the display panel 300. When the display panel 300 is an organic light emitting diode panel, a protection film 40, such as a colored polyimide film, may be attached to a bottom surface of the display panel 300. When the display panel 300 is a liquid crystal (LC) panel, the film attached to the bottom surface of the display panel 300 may be a polarizer.

The touch panel 10 on which the touch electrodes are disposed is attached to the polarizer 30. Accordingly, since the touch electrodes are disposed on the polarizer 30, the light reflection from the touch electrodes may not be prevented by the polarizer 30. However, since the touch electrodes according to an exemplary embodiment of the present invention have the structure that may minimize the light reflection as described above, although the touch electrodes are disposed on the polarizer 30, the light reflection from the touch electrodes may be prevented. According to an exemplary embodiment of the present invention, the touch electrodes may alternatively be directly formed on an outer surface of the display panel 300 or on the inside thereof, thus the display panel 300 may be the touch panel 10. A window 50 formed of a material, such as glass may, be attached to the touch panel 10.

Adhesive layers 61, 62, 63, and 64 may be respectively disposed to attach the polarizer 30 on the display panel 300, the protection film 40 on the display panel 300, the touch panel 10 on the polarizer 30, and the window 50 on the touch panel 10. The adhesive layers 61, 62, 63, and 64 may be made of a pressure sensitive adhesive (PSA) such as a silicon PSA, or an optical clear adhesive (OCA).

The display panel 300 includes gate lines G1 to Gn, data lines D1 to Dm, and pixels connected to the gate lines G1 to Gn and the data lines D1 to Dm and arranged substantially in a matrix form. The touch panel 10 includes touch signal lines T1 to Tp and touch sensor units TSUs connected to the touch signal lines T1 to Tp and arranged substantially in a matrix form. The touch sensor units TSUs are formed by the first and second touch electrodes 410 and 420 described above.

The gate lines G1 to Gn substantially extend in a horizontal direction and transmit gate signals including gate-on voltages for turning on switching devices, such as thin-film transistors (TFTs) connected to the respective pixels PXs, and gate-off voltages for turning off the switching devices. The data lines D1 to Dm substantially extend in a vertical direction and transmit data voltages. When the switching devices are turned on depending on the gate-on voltages, the data voltages applied to the data lines are applied to the pixels.

The pixel may be a minimum unit displaying an image, and one pixel may display one of primary colors, such as red, green, and blue, or pixels may alternately display the primary colors during a corresponding time to display a desired color by the spatial and temporal sum of the primary colors. The pixel PX may have a quadrangular shape. A common voltage and the data voltages are applied to each pixel PX.

The touch signal lines T1 to Tp are connected to the touch sensor units TSUs to transmit driving signals and output signals to the touch sensor units TSUs. Some of the touch signal lines T1 to Tp may be input lines transmitting the driving signals to the touch sensor units TSUs, and the others thereof may be output lines transmitting the output signals from the touch sensor units TSUs.

The touch sensor units TSUs may generate the output signals depending on a touch in a mutual capacitance scheme. The touch sensor units TSUs may receive the driving signals from the touch signal lines T1 to Tp and output the output signals based on the change in the capacitance from the touch of an external object, such as a finger, pen, or the like, through the touch signal lines T1 to Tp. The touch sensor units TSUs may also be operated in a self-capacitance scheme.

The signal controller 600 may receive input image signals R, G, and B from an external graphics processor (not illustrated) and control signals CONT of the input image signals, that is, a horizontal synchronization signal, a vertical synchronization signal, a clock signal, a data enable signal, and the like. The signal controller 600 processes the image signals R, G, and B based on the image signals R, G, and B and the control signals CONT, so as to be suitable for an operation condition of the display panel 300, and then generates and outputs image data DAT, gate control signals CONT1, data control signals CONT2, and clock signals. The signal controller 600 may further output synchronization signals Sync to the touch controller 700 and receive touch information from the touch controller 700.

The gate control signal CONT1 includes a start pulse vertical signal indicating a start of the gate signal, and a clock pulse vertical signal that becomes a reference for generating the gate-on signal. An output period of the start pulse vertical signal corresponds to one frame (or a refresh rate). The gate control signal CONT1 may further include an output enable signal defining a duration of the gate-on voltage.

The data control signal CONT2 includes a start pulse horizontal signal indicating a transmission start of the image data DAT for pixels in one row, and a load signal allowing corresponding data voltages to be applied to the data lines D1 to Dm. When the display panel 300 is a liquid crystal display panel, the data control signals CONT2 may further include a reversion signal reversing a polarity of the data voltage for the common voltage.

The gate driver 400 applies the gate signals, which are the gate-on voltages, and the gate signals which are the gate-off voltages, to the gate lines G1 to Gn depending on the gate control signals CONT1.

The data driver 500 receives the data control signal CONT2 and the image data DAT from the signal controller 600, converts the image data DAT into a data voltage using a gray-level voltage generated from a gray-level voltage generator (not illustrated), and applies the converted data voltage to the data lines D1 to Dm.

The touch controller 700 transmits input signals to the touch sensor units TSUs, and receives output signals from the touch sensor units TSUs to generate the touch information. The touch controller 700 may include a signal processor (not illustrated) processing the output signals from the touch sensor units TSUs.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch panel, comprising:
   a touch electrode disposed on a substrate, the touch electrode comprising:
   a metal layer;
   a phase matching layer disposed on the metal layer, the phase matching layer comprising aluminum oxide and having a thickness in a range of about 500 to 750 Å; and
   a thin film layer disposed on the phase matching layer;
   an insulating layer comprising silicon nitride disposed on the touch electrode; and
   a reflective reduction layer comprising a silicon oxynitride disposed on the insulating layer,
   wherein the reflectance of the touch electrode is less than or equal to 3.7%.

2. The touch panel of claim 1, wherein the phase matching layer and the thin film layer are configured to cause a destructive interference between light reflected from the metal layer and light reflected from the thin film layer.

3. The touch panel of claim 1, wherein the metal layer comprises an aluminum-based metal.

4. The touch panel of claim 3, wherein the metal layer has a thickness in a range of about 300 to 4000 Å.

5. The touch panel of claim 3, wherein the phase matching layer is optically transparent.

6. The touch panel of claim 1, wherein the thin film layer comprises a metal.

7. The touch panel of claim 6, wherein the metal of the thin film layer comprises titanium or molybdenum.

8. The touch panel of claim 6, wherein the thin film layer has a thickness in a range of about 50 to 200 Å.

9. The touch panel of claim 1, wherein the insulating layer has a thickness in a range of about 1000 to 4000 Å.

10. The touch panel of claim 1, wherein the reflective reduction layer has a thickness in a range of about 500 to 1000 Å.

11. The touch panel of claim 1, further comprising:
    an insulating layer comprising an organic material disposed on the touch electrode.

12. The touch panel of claim 11, wherein the insulating layer has a thickness in a range of about 1 to 3 μm.

13. The touch panel of claim 1, wherein the touch electrode comprises a mesh pattern.

14. The touch panel of claim 1, further comprising:
    a display panel configured to display an image.

15. The touch panel of claim 14, further comprising:
    a polarizer disposed between the touch electrode and the display panel.

16. The touch panel of claim 15, wherein the substrate on which the touch electrode is disposed is disposed on the polarizer.

* * * * *